May 22, 1951  J. S. ASHDOWNE  2,553,739
MOTORCYCLE SADDLE BAG MOUNTING
Filed Feb. 2, 1948
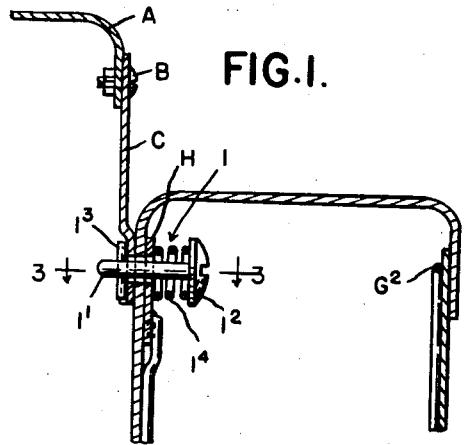
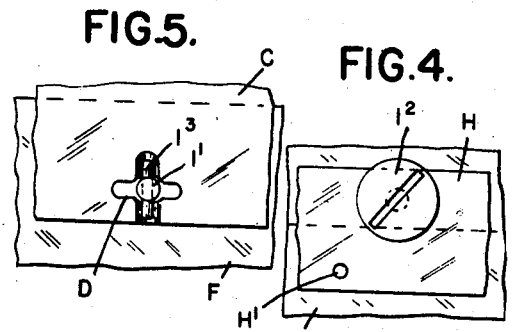
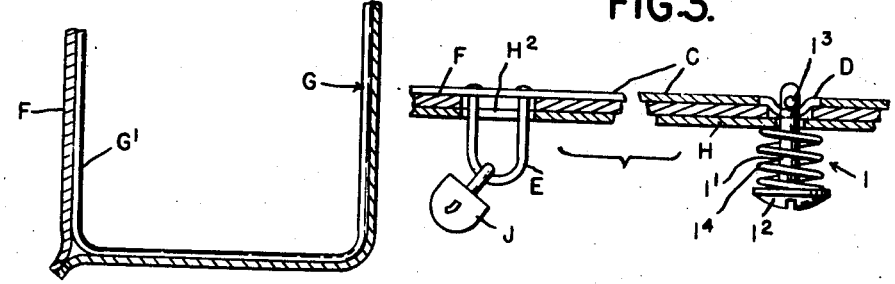
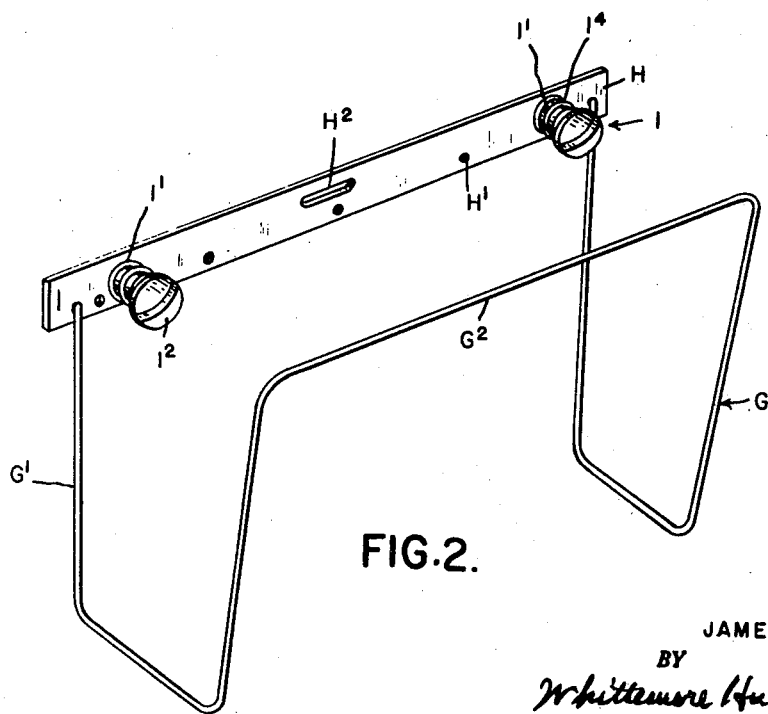
INVENTOR.
JAMES S. ASHDOWNE
BY Whittemore Hulbert & Belknap
ATTORNEYS Patented May 22, 1951

2,553,739

UNITED STATES PATENT OFFICE 2,553,739

MOTORCYCLE SADDLEBAG MOUNTING

James S. Ashdowne, Detroit, Mich., assignor to Jos. Buegeleisen Co., Detroit, Mich., a corporation of Michigan Application February 2, 1948, Serial No. 5,758

5 Claims. (Cl. 224—38)

The invention relates to mountings for saddle bags on motorcycles, and it is the object of the invention to obtain a construction in which there are no detachable parts other than those secured, respectively, to the motorcycle and bag. To this end the invention consists in the construction as hereinafter set forth.

In the drawings:

Fig. 1 is a vertical cross-section through the saddle bag showing the same as mounted upon the motorcycle frame;

Fig. 2 is a perspective view of a reinforcing frame for the bag having mounted thereon the means for attaching or detaching the bag from the motorcycle, which frame when engaged with the bag is permanently attached thereto;

Fig. 3 is a horizontal section substantially on line 3—3, Fig. 1;

Fig. 4 is an elevation of the attachment means viewed from inside the bag; and

Fig. 5 is an elevation thereof viewed from outside the bag and showing the same attached to the motorcycle frame.

The motorcycle (not shown) is provided with a mud guard A of the usual construction, to the side of which is attached preferably by bolts B a vertically extending plate C. This plate has a horizontally extending lower edge and adjacent to this edge has a plurality of key slots D for the engagement of bag attachment means. There is also secured to the plate C, centrally of the length thereof, a staple E which projects outward to engage a registering aperture in the inner wall of the saddle bag. The saddle bag F may be of any suitable construction preferably formed of leather and this is reinforced by an inner frame G. As shown the frame G is partly formed of a bent rod having U-shaped portions G' at opposite ends thereof with a connecting portion $G^2$ at the top adjacent to the front side of the bag. The frame G has a horizontally extending plate H, which is permanently attached to the bag preferably by rivets H'. This plate has a central slot $H^2$ for receiving the staple E and upon opposite sides of this slot are fastener devices I in registration, respectively, with the key slots in the plate C. Each fastener device is formed by a stem I' having a head $I^2$ at its inner end, said stem passing through the plate H and adjacent wall of the bag being provided with a key, such as a cross-pin $I^3$. There is also a spring $I^4$ sleeved upon the stem and having its opposite ends abutting, respectively, against the head $I^2$ and the plate H. Thus after the bag is engaged with the staple E, the key or cross-pin $I^3$ can be inserted through the registering key slot by pressing inward on the head $I^2$ against the resistance of the spring $I^4$, and by then giving a quarter turn to the head said pin will extend transverse to the key slot to effect a securing of the bag to the motorcycle. Preferably the plate C is provided with a groove transverse to the key slot with which the pin $I^3$ is engaged to hold it against accidental displacement. It is to be noted that there are no detachable parts other than those respectively secured to the motorcycle and the bag. Therefore the bag is always in condition for mounting on the motorcycle and can be easily detached therefrom whenever desired. To prevent unauthoribed detachment of the bag, a padlock J may be engaged with the staple E inside of the bag.

What I claim as my invention is:

1. A motorcycle saddle bag mounting, comprising a pair of plates respectively secured to a mud guard of a motorcycle and within said bag to the wall thereof adjacent to said motorcycle, said first-mentioned plate having a member projecting outward therefrom and also having one or more key slots therein spaced from said projecting member, said bag contained plate forming a reinforcement for said bag and being apertured for the passage of said projecting member therethrough, and fastener means permanently mounted on the latter plate in registration with each of said key slots and including a rotary head, a shank secured to said head extending through said plate and provided with a key at its outer end and a spring on said shank for retracting the same whereby said bag may be secured by pressing inward said head and shank to pass the key through said key slot and by then rotating said head to move said key out of registration with said slot.

2. A motorcycle saddle bag mounting, comprising a pair of plates respectively secured to a mud guard of the motorcycle and within said bag to the wall thereof adjacent said motorcycle, said first-mentioned plate having a staple projecting outward therefrom and also having one or more key slots therein spaced from said staple, said bag contained plate forming a reinforcement for said bag and being apertured for the passage of said staple therethrough, fastener means permanently mounted on the latter plate within said bag provided with a rotary head and a shank connected thereto extending through said plate and having a key at its outer end in registration with the corresponding key slot whereby said key may be inserted through said slot and then turned out of registration therewith, and resilient means for retracting said shank to hold said key in its non-registering position, and a lock for engaging said staple within said bag to hold the same from unauthorized removal.

3. A motorcycle saddle bag mounting, comprising a pair of plates respectively secured to a mudguard of the motorcycle and within said bag to the wall thereof adjacent said motorcycle, said first-mentioned plate having a member projecting outward therefrom and also provided with one or more key slots therethrough spaced from said projecting member with a groove in the inner face of said plate transverse to said slot, said bag contained plate being apertured for the passage of said projecting member therethrough and fastener means permanently mounted on the latter plate in registration with each of said key slots and including a rotary head within the bag, a shank extending through said plate and having a key at its outer end and a spring on said shank for retracting the same whereby pressure on said head will project said key through said key slot and a turn of said head will register said key with said groove to be drawn into engagement therewith by said spring.

4. A motorcycle saddle bag mounting, comprising a plate secured to the mud guard of the motorcycle to extend longitudinally in a vertical plane, said plate having a staple projecting outward therefrom and also provided with one or more key slots therein spaced from said staple, a bag, a reinforcing frame within said bag having a wire portion and a plate portion extending longitudinally on the rear side of the bag and secured thereto, the latter plate having a slot therein and in the adjacent wall of the bag for the passage of said staple, and fastener means permanently mounted on the bag contained plate in registration with each of said key slots, said fastener means including a rotary head within the bag, a shank extending through the plate and adjacent wall of the back and having a key at its outer end, and a spring on said shank for retracting the same whereby pressure on said head will force said shank and key through the registering key slot and a partial rotation of said head will secure the bag.

5. A motorcycle saddle bag mounting comprising a plate secured to a mud guard of the motorcycle, a plate permanently secured to an inner wall of the bag to form a reinforcing portion therefor, said first mentioned plate having a member projecting outward therefrom and also provided with one or more key slots therethrough spaced from said projecting member with a groove in the inner face of said plate transverse to said slot, said bag contained plate being apertured for the passage of said projecting member therethrough, and fastener means permanently mounted on the latter plate in registration with each of said key slots, said fastener means being provided with a key for engagement with said transverse grooves to secure said bag and also having a knob within the bag for turning said key after insertion thereof through said slot.

JAMES S. ASHDOWNE.

REFERENCES CITED

The following references are of record in the file of this patent:

UNITED STATES PATENTS

| Number | Name | Date |
|---|---|---|
| 643,035 | Bennett | Feb. 6, 1900 |
| 2,423,003 | Buegeleisen | June 24, 1947 |